This invention relates to an electrically-controlled micrometer for precise measurement of length.

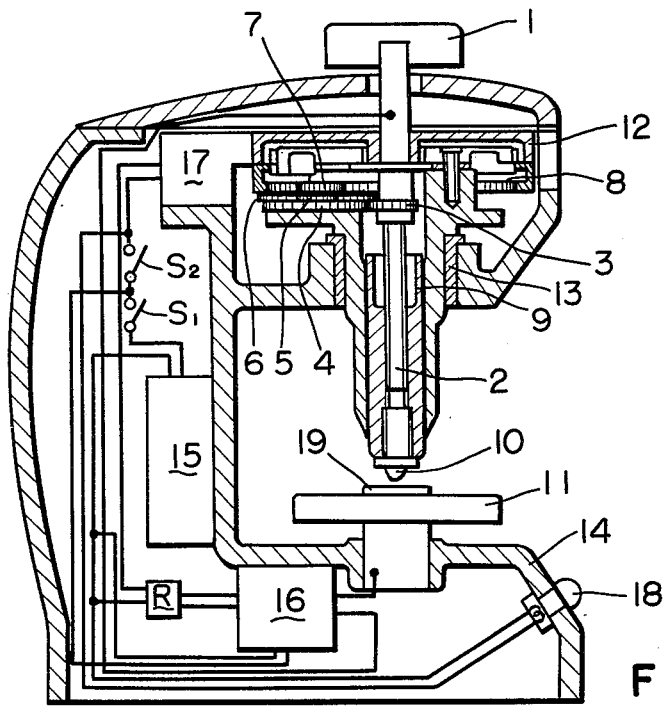
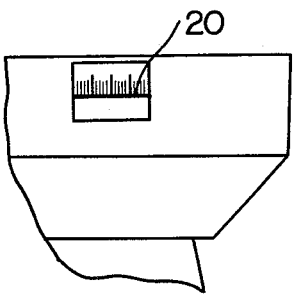
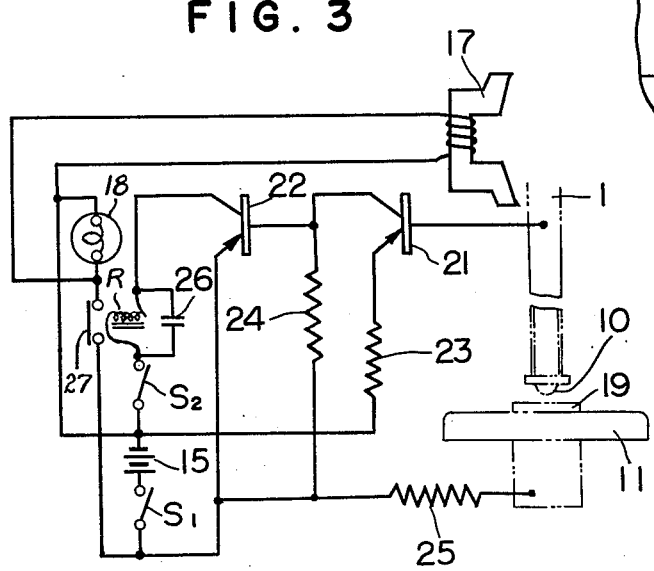
INVENTORS
S. Shirakura
H. Shimano
M. Ueno 3,166,851
ELECTRIC-CONTROLLED MICROMETER
Shiro Shirakura, Shinagawaku, Tokyo, Hiroshi Shimano, Setagayaku, Tokyo, and Masaroku Ueno, Sakato, Kawasaki, Japan, assignors to Yehan Numata, Yokohama, Japan
Filed Apr. 9, 1962, Ser. No. 186,231
4 Claims. (Cl. 33—166)

It is the objective of the present invention to offer a micrometer with such extremely stabilized performance that it exerts zero or near-zero measuring pressure of constant magnitude on the sample and its signal current for measurement is so feeble as to be harmless to the sample.

To realize the above objective, an electrically-controlled micrometer according to this invention includes within its frame; a transistor, a D.C. amplifier, a dry cell for power source, a magnet, a pilot lamp and a graduated drum for the convenience of reading from outside, these being connected with one another by lead wire. Through manipulation of the handle provided outside the frame, the said graduated drum is rotated and at the same time the test member is lowered; when the said test member comes into direct or indirect contact with the sample on the measuring table, an electric circuit is closed and the amplified current causes the said pilot lamp to light up and the said magnet to be energized, whereby the said magnet attracts the said graduated drum, it being so arranged that the pointer and the handle may not be farther moved by this attraction.

For the sake of better understanding of the essentials of this invention, a detailed account will be made with reference to the attached drawing, in which FIG. 1 shows a longitudinal section, FIG. 2 a partial view of the graduated portion through the front window, and FIG. 3 an electric wiring diagram.

Within the frame 14 there is a cavity, which holds a dry cell 15, a transistorized D.C. amplifier 16, and a magnet 17; and a pilot lamp 18 and a graduated drum 12, the latter two being visible from outside the said frame 14. All these are connected as shown in the wiring diagram of FIG. 3. Meanwhile, the handle 1 is fixed to the graduated drum 12, a drive gear 3 and a spindle 2. Meshing with the said drive gear 3 there is provided laterally a large gear 4 and there is another small gear 5 which rotates coaxially with the said gear 4. Further laterally in mesh with the said gear 5 there is provided another large gear 6 and there is still another small gear 7 which coaxially rotates with the said gear 6. Finally there is an internal gear 8 which engages with the said small gear 7.

When the power source switch $S_1$ and the magnet brake release switch $S_2$ are thrown, the sample 19 is placed on the measuring table 11 and then the handle 1 is turned, the drive gear 3 is simultaneously turned, thereby causing the gears 4, 5, 6, 7 and 8 and the graduated drum to be rotated. Meanwhile, the spindle 2, too, is rotated and the internally threaded member 9 meshing with the external thread on the said spindle 2 comes down, the test member 10 at the tip of the said internally threaded member 9 lowering itself together with the said screw 9. When the tip of this test member 10 comes into contact with the sample 19, the circuit of the dry cell 15 will be closed if the said sample is electroconductive, and the transistorized D.C. amplifier 16 will work to actuate the relay R. Thus the circuit of the pilot lamp 18 is closed to light up the said lamp and at the same time the magnet 17 is energized to create a force which suppresses further rotation of the graduated drum 12.

By taking the micrometer reading at this moment, the dimensions of the sample can be measured.

The electrical operation involved in the above process will be described in more detail with reference to FIG. 3. As soon as the tip of the test member 10 touches an electrically conductive sample 19, the circuit consisting of cell 15—high resistance 25—measuring table 11—sample 19—test member 10—handle 1—transistor 21 from base to emitter—low resistance 23, is closed to pass a feeble signal current, which is a base current of the said transistor 21. More specifically speaking, the collector current of the transistor 21 causes through the resistance 24 a potential difference between emitter and base in the transistor 22, thereby generating a base current in the said transistor 22. Thus, analogous to the transistor 21, the transistor 22 has its collector current decided by its base current and passed through the relay R; thereby the current flowing through the relay R will be approximately 500 times the said feeble signal current. Then the relay R acts to close the relay contact 27, thereby exciting the pilot lamp 18 and the magnet 17.

Since the electric circuit operates on a feeble signal current, an instantaneous contact will promptly energize the magnet 17 and the measuring pressure can be controlled to zero or near-zero. In order to prepare the micrometer to take another measurement, the magnet brake release switch $S_2$ is opened, the handle 1 is reversed, and the internally threaded member 9 is raised to restore the original condition.

In FIG. 3, the condenser 26 serves to stabilize the action of the relay R; in FIG. 1, 13 is an insulating bushing; and in FIG. 2, 20 is a micro-adjustment scale.

As described above, in this invention a turning of the handle 1 moves the internally threaded member 9 which is engaged with the external threads on the spindle 2, and thereby the test member 10 at the tip of the said screw 9 makes a straight forward movement.

The said external thread having a pitch of 0.5 mm., a single turn of the handle 1, that is, a single turn of the spindle 2 will effect a progress of the test member 10 over a distance of 0.5 mm. At the same time the rotation will be transmitted from the gear 3 fitted with the spindle 2 through the gears 4, 5, 6 and 7 to the internal gear 8, on the periphery of which there are numerical figures inscribed at 25 equal intervals. The rotating ratio between the handle 1 and the said gear 8 being 50:1, 50 turns of handle 1 will be equivalent to 1 turn of the said gear 8, thereby displacing the test member 10 by 25 mm.

For the sake of micro-reading, the spindle 2 and the graduated drum 12 are fixed to each other and the graduated drum 12 has a scale of 500 equi-divisions. The pitch of the spindle 2 being 0.5 mm., one of the said 500 equi-divisions will represent 0.001 mm.

Thus, in this invention a contacting of a sample 19 with the test member 10 actuates the transistorized D.C. amplifier 16 and the relay R, closing the circuit of the pilot lamp 18 and lighting up the latter; at the same time, the magnet 17 acts as a brake to arrest further rotation and accordingly further progress of the test member. Therefore the measuring pressure is almost zero, which makes it possible to measure the sample 19 without any deformation. Meanwhile, the signal current is so feeble that it will never damage the sample 19, it is needless to say. In case the sample 19 happens to be non-electro conductive, the measuring table 11 is electrically connected with some adequate block gauge; the non-conductive sample is placed on this block gauge and after measurement similarly done to the above, the known value of the said gauge is deducted from the data obtained to give the true value of measurement.

What is claimed is:

1. In an electrically controlled micrometer comprising a frame, an elongated test member mounted in said frame for longitudinal displacement with respect thereto, rotatable indicating means, rotatable actuating means, positively intermeshing drive means connecting said actuating means and test member for simultaneously rotating said indicating means and longitudinally displacing said test member, an anvil in longitudinal alignment with but normally spaced from one end of said test member, and an electrical circuit including said anvil and test member which is closed whenever the space between said anvil and test member is bridged by electrically conductive material, the improvement which comprises a stationary electromagnet carried by said frame and connected to be energized upon closure of said circuit, at least one of said rotatable means being made of magnetic metal and said electromagnet being positioned to attract and immobilize, when energized, said at least one rotatable means, thereby simultaneously immobilizing said indicating means, actuating means, and test member.

2. A micrometer as claimed in claim 1 in which said electromagnet is positioned to attract said indicating means.

3. A micrometer as claimed in claim 1 comprising an electric circuit for energizing said magnet which is separate from and has an impedance much lower than the circuit including said anvil and test member, and means actuated by the passage of current through the circuit of said anvil and test member for closing the separate circuit through said magnet.

4. A micrometer as claimed in claim 1 in which said test member is moved along its longitudinal axis by said actuating member through intermeshing screw threads, and said indicating means comprises a drum coaxial with but having a diameter substantially larger than that of said test member, so that each vertical movement of said test member is accompanied a relatively large displacement of the periphery of said drum.

References Cited by the Examiner

UNITED STATES PATENTS

| | | | |
|---|---|---|---|
| 1,760,609 | 5/30 | Rowan et al. | 33—126.6 |
| 2,005,887 | 6/35 | Carson | 33—125 |
| 2,403,896 | 7/46 | Aller | 33—147 |
| 2,431,099 | 11/47 | Wiseman et al. | 33—147 |
| 2,453,306 | 11/48 | Davis | 33—148 |
| 2,567,333 | 9/51 | Gogan | 33—172 |

FOREIGN PATENTS 1,108,950    7/61    Germany.

ISAAC LISANN, *Primary Examiner.*